United States Patent
Silvano

[11] Patent Number: 6,099,256
[45] Date of Patent: *Aug. 8, 2000

[54] THREE DIMENSIONAL FIGURE EIGHT PROPELLER/IMPELLER BLADE APPARATUS

[76] Inventor: David Silvano, 4041 NE. 12th Ave., Pompano Beach, Fla. 33064

[*] Notice: This patent is subject to a terminal disclaimer.

[21] Appl. No.: 09/137,565

[22] Filed: Aug. 20, 1998

Related U.S. Application Data

[63] Continuation-in-part of application No. 08/788,221, Jan. 27, 1997, Pat. No. 5,890,875.

[51] Int. Cl.⁷ .............................. B63H 1/26; B64C 11/16; F04D 29/38; B01F 7/32
[52] U.S. Cl. ................................. 416/227 R; 416/227 A; 29/428; 29/889.6; 29/889.7; 228/144; 228/173.6
[58] Field of Search ............................ 416/227 R, 227 A; 366/270, 343, 292, 325.6, 330.1; 29/889.3, 889.6, 889.7, 894.35, 894.351, 428; 228/144, 173.6; 440/49, 81

[56] References Cited

U.S. PATENT DOCUMENTS

| | | | |
|---|---|---|---|
| 1,023,699 | 4/1912 | Wilk | 440/81 |
| 4,242,002 | 12/1980 | Kawabata | 366/343 |
| 4,293,279 | 10/1981 | Bolie | 416/227 A |
| 4,445,817 | 5/1984 | Wethern | 416/227 A |
| 4,472,063 | 9/1984 | Eickelmann | 366/343 |
| 5,169,055 | 12/1992 | Peterson et al. | 228/173.6 |
| 5,269,647 | 12/1993 | Moser | 416/227 R |
| 5,405,246 | 4/1995 | Goldberg | 416/227 A |
| 5,411,330 | 5/1995 | Arutyunov | 416/227 R |
| 5,890,875 | 4/1999 | Silvano | 416/227 R |

FOREIGN PATENT DOCUMENTS

| | | | |
|---|---|---|---|
| 819229 | 10/1937 | France | 416/227 A |
| 18431 | 11/1889 | United Kingdom | 416/227 A |

*Primary Examiner*—Christopher Verdier
*Attorney, Agent, or Firm*—Law Practice of Scott L. Lampert, PA; Scott L. Lampert

[57] ABSTRACT

A propeller/impeller blade adapted to propel a vehicle or other device, create a vacuum, or move a medium, comprising a generally flat strip-like member having first and second opposite ends joined together to form a pair of contiguous loops with a generally figure eight configuration about its longitudinal axis. The upper and lower surfaces of the loops are continuous throughout its figure eight configuration and structured so that if one were to trace along the upper surface longitudinally in a single direction, they will return to the same location on the upper surface from where they began without traversing the lower surface. In use, the pair of loops are mounted on the shaft of the desired device so that each loop is disposed symmetrically about the longitudinal axis of the shaft and the longitudinal axis of the pair of loops is disposed in perpendicular relation to the longitudinal axis of the shaft.

5 Claims, 6 Drawing Sheets

PRIOR ART

THREE DIMENSIONAL FIGURE EIGHT PROPELLER/IMPELLER BLADE APPARATUS

This is a continuation-in-part of application Ser. No. 08/788,221, filed Jan. 27, 1997, now U.S. Pat. No. 5,890,875.

BACKGROUND OF THE INVENTION

1. Field of the Invention

This invention pertains in general to the field of propelling apparatus for generation of a thrust or for fluid flow, and in particular to the field of blade apparatus for powering a shaft, propelling a vehicle or for pumping a fluid, gas, liquid or any other mixture, or any other medium.

2. Description of the Related Art

Blades are commonly used in various devices, such as propellers, turbines, pumps, blowers, fans and other like apparatus. Whether used as a propeller or an impeller, an aircraft propeller, boat propeller or a fan, the blades themselves are essentially the same. Typically, the blades are twisted, angled and symmetrically arranged around the circumference of a hub or shaft.

The basic blade design has not changed for many years. What differs is the blade orientation, the medium being moved by the blades and the direction of movement. The blades may be structured to either propel a medium, such as a liquid, gas or slurry past the blades or to cause a medium to impinge upon the blades to cause rotation of the blades about a shaft. For example, a boat propeller generally consists of two or more blades twisted and raked backwards to propel water away from the boat, thereby propelling the boat forward. Furthermore, the propeller's performance is a function of the overall diameter, the amount of rake and the pitch of the blades. Blades having low pitch angles are generally more power producing than blades having high pitch angles, whereas blades having high pitch angles generally produce greater speed.

While there exist a number of inventions which are said to increase the performance of propellers and impellers, such inventions utilize the basic blade design discussed above. Such inventions merely include changes to the rake and pitch angles or add vanes to the blades.

Although somewhat useful for their intended purpose, these prior art blades include certain inherent limitations and, therefore, have not proven to be entirely satisfactory. Specifically, the rake and pitch which may be achieved using the prior art blades is limited because the transverse flow components of the prior art blades are diminished at the inner and outer ends of the blades, thereby wasting energy and losing efficiency. This is best illustrated by reference to FIG. 14A which shows that there is virtually no useful flow produced by the prior art blades at the inner proximate end and outer distal end of the blades. Furthermore, due to such inefficient waste of energy, the prior art blades are often unstable and must be constructed of rigid materials to maintain their stability. For instance, ceiling fan blades are often difficult to balance and frequently become unbalanced over time due to their inefficient operation. Moreover, being restricted to rigid materials increases the cost of devices utilizing these prior art blades and limits the design alternatives, both functional and aesthetic, which can be achieved if other more flexible materials were used.

Some devices have been developed which differ from the standard prior art blade configurations discussed. Most merely change the blade orientation with respect to the shaft so that the longitudinal axis of the blades are parallel to the shaft. Typically, these devices are specifically designed for use with wind turbines or mixers or agitators in a vertical orientation. However, there is no suggestion in these prior art devices to orient the blades horizontally or in perpendicular relation to the shaft and there is no indication or suggestion that such vertically oriented blades will have any effect upon the transverse energy or stability of the blades.

Another device, shown in U.S. Pat. No. 5,411,330, discloses a mixing accessory which comprises a pair of moebius FIG. 8 shaped blades longitudinally disposed along parallel shafts. However, this device, like the other prior art devices discussed above, is specifically designed for mixing or agitating and is vertically oriented along the shaft. The lack of disclosure, suggestion or teaching in the prior art problem addressed by applicant supports the conclusion that part of applicant's invention is the discovery of the problem, that is, the need for a propeller/impeller blade structured so that the transverse energy is not diminished at the inner and outer ends of the blade, thereby providing more efficient operation, improved rake and pitch and greater stability.

Accordingly, there is still a need in the art for a propeller/impeller blade structured so that the transverse energy is not diminished at the inner and outer ends of the blade, thereby providing more efficient operation, improved rake and pitch and greater stability. Any such device should allow for the use of a wide range of materials to accommodate different applications and decrease the cost of the blades. The present invention is particularly suited to overcome those problems which remain in the art in a manner not previously known.

SUMMARY OF THE INVENTION

The present invention is directed towards a new and improved propeller/impeller blade, for use with devices adapted to propel a vehicle or other device, create a vacuum, or move a medium, comprising a generally flat strip-like member having first and second opposite ends joined together to form a pair of contiguous loops with a generally figure eight configuration about its longitudinal axis. The upper and lower surfaces of the loops are continuous throughout its figure eight configuration and structured so that if one were to trace along the upper surface longitudinally in a single direction, they will return to the same location on the upper surface from where they began without traversing the lower surface. In use, the pair of loops are mounted on the shaft of the desired device so that each loop is disposed symmetrically about the longitudinal axis of the shaft and the longitudinal axis of the pair of loops is disposed in perpendicular relation to the longitudinal axis of the shaft.

It is an object of the present invention to provide a new and improved propeller/impeller blade apparatus which has all the advantages of the prior art devices and none of the disadvantages.

It is another object of the present invention to provide a propeller/impeller blade apparatus which has improved performance characteristics over the blades of conventional propellers, blowers, fans, pump impellers, etc.

It is also an object of the present invention to provide such an apparatus which does not diminish the transverse energy at its inner and outer ends, thereby improving the overall flow, efficiency and stability.

It is a further object of the present invention to provide such an apparatus which can be used for pumping, turning a shaft and propelling applications.

It is yet another object of the present invention to provide such an apparatus which is of simple construction and, therefore, economical to manufacture.

It is yet a further object of the present invention to provide such an apparatus which can be constructed of both rigid and flexible materials.

These and other objects and advantages of the present invention will become more readily apparent in the description which follows.

BRIEF DESCRIPTION OF THE DRAWINGS

For a fuller understanding of the nature of the present invention, reference should be had to the following detailed description, taken in connection with the accompanying drawings in which.

Like reference numerals refer to like parts throughout the several views of the drawings.

DETAILED DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

As shown in FIGS. 1–13, the present invention is directed towards a new and improved propeller/impeller blade apparatus 10 for use with devices adapted to propel a vehicle or other device, create a vacuum, or move a medium. As best shown in FIGS. 11A–11C, the propeller/impeller blade apparatus 10 of the present invention comprises a generally flat strip-like member 61 having first 62 and second 63 ends joined together to form a pair of contiguous loops with a generally figure eight configuration about its longitudinal axis. The pair of loops are structured so that the upper 68 and lower 69 surfaces of the flat member 61 are continuous throughout its figure eight configuration in such a manner that if one were to trace along the upper surface 68 longitudinally in a single direction, they will return to the same location on the upper surface 68 from where they began without traversing the lower surface 69.

The flat member 61 may either be comprised of a single strip of material or a plurality of strips of material 99, 99'. Although prior art blades typically may only be constructed of rigid materials, the improved rake and pitch, stability and overall efficiency of the propeller/impeller blade apparatus 10 of the present invention may be constructed of either rigid or flexible materials, such as steel, brass, bronze, plastic, polypropylene, paper or any other suitable material. Moreover, the flat member 61 may be of uniform cross section or may include a varying cross-sectional shape, depending upon the particular application and desired performance.

In use, the pair of loops are mounted on the shaft of the desired device so that each loop is disposed symmetrically about the longitudinal axis of the shaft and the longitudinal axis of the pair of loops is disposed in perpendicular relation to the longitudinal axis of the shaft. In the various embodiments discussed herein, each loop comprises a blade.

Figure 1:
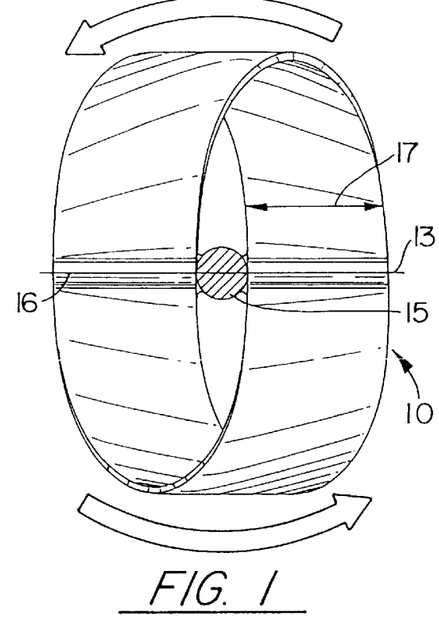
FIG. 1 is a front plan view of a configuration of the inventive blade, designed to rotate in a first direction.

FIGS. 1–4 illustrate two blade arrangements made in accordance with the present invention. In these embodiments, as mentioned above, the loops extending symmetrically about the shaft 15, 25 constitute blades 11, 12, 21, 22. The blade embodiment 10 in FIG. 1 could be considered as having a right handed pitch, the pitch being relevant to the direction of rotation. Thus, if the blade embodiment 10 is used as a boat propeller, it would rotate counter-clockwise, as depicted in FIG. 1, when viewed from the rear of the boat. Conversely, the blade embodiment 20 in FIG. 3 would rotate clockwise when viewed from the same perspective. The directions of rotation in blade embodiments 10 and 20 are defined by the flow of water through the blades 11, 12, 21, 22.

Figure 2:
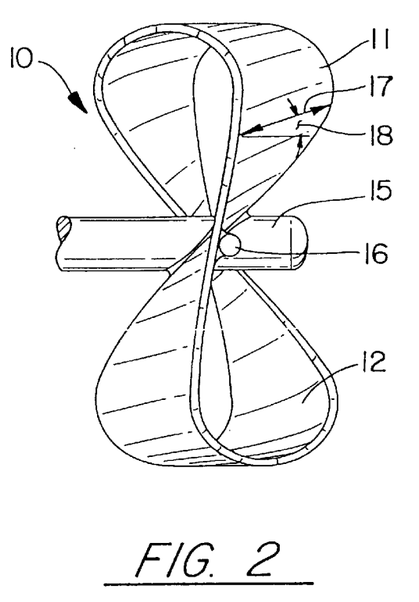
FIG. 2 is a left side view of the blade configuration of FIG. 1.
Figure 3:
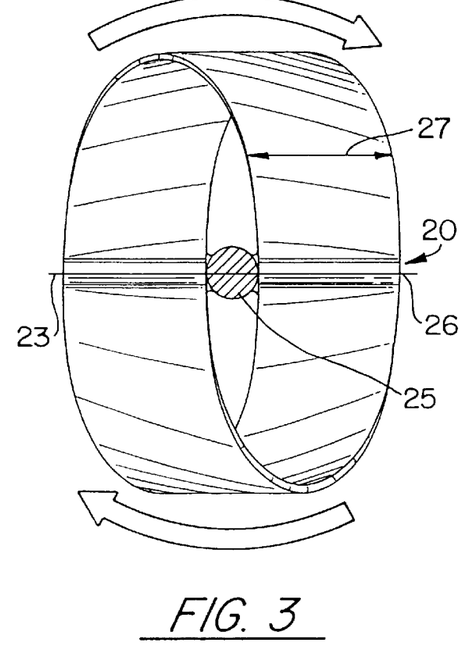
FIG. 3 is a front plan view of a configuration of the inventive blade, designed to rotate in a direction opposite to that of the blade shown in FIG. 1.
Figure 4:
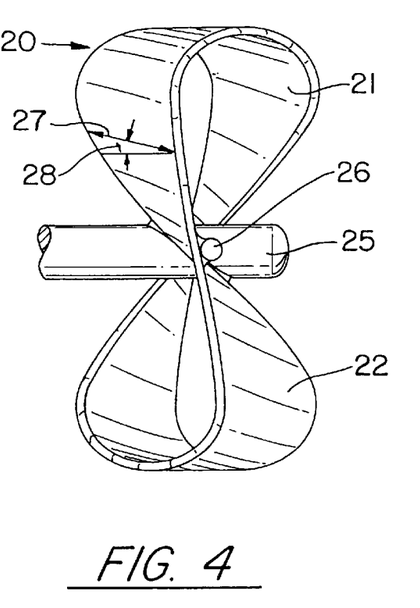
FIG. 4 is a left side view of the blade configuration of FIG. 3.

FIGS. 2 and 4 show left side views of the blade embodiments 10 and 20 of FIGS. 1 and 3, respectively and more clearly show the loops comprising the blades 11, 12, 21, 22. In embodiments 10 and 20, each blade 11, 12, 21, 22 is equivalent and symmetrical with its opposite respective counterpart. That is, the length, height, thickness, width, curvature, twist, etc. are the same for each respective opposite blade 11, 12, 21, 22. At the junction of each loop, the flat portion of each of the blades are generally coplanar 13, 23, thereby facilitating the mounting of the blades 11, 12, 21, 22 to a shaft 15, 25. The blades 11, 12, 21, 22 may be mounted to the shaft 15, 25 by attaching a bar or pin 16, 26 along the coplanar common line 13, 23 of the flat portions of the blades 11, 12, 21, 22 and through the shaft 15, 25. Other suitable attachment means may, alternatively, be used.

Figure 14A:
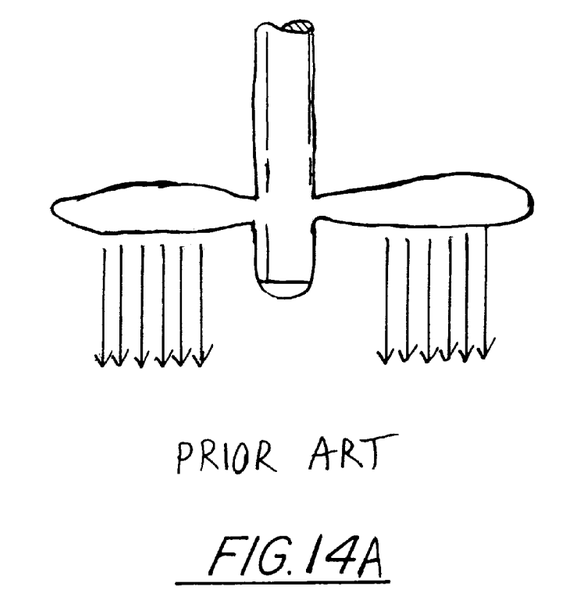
FIG. 14A is a side view of the prior art blades showing the absence of useful flow at the inner and outer ends of the blades.
Figure 14B:
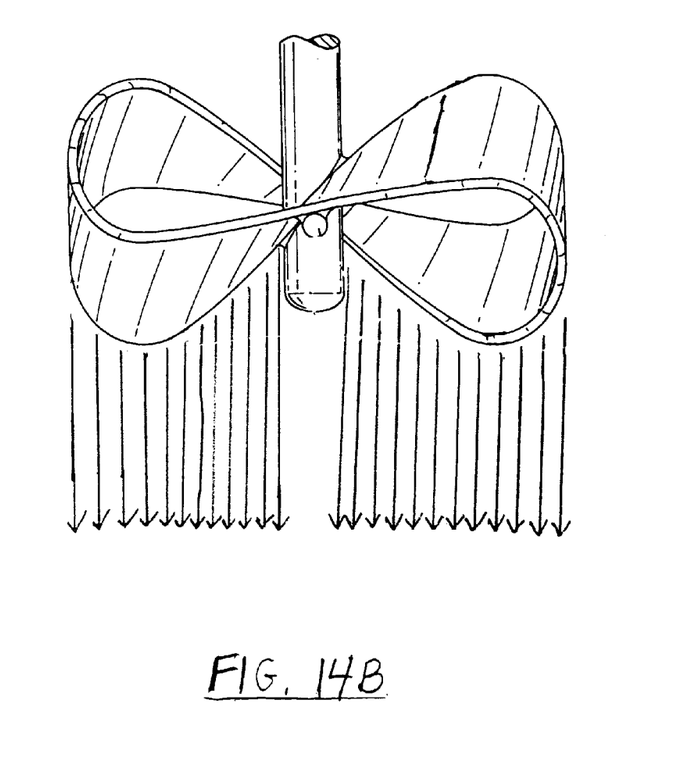
FIG. 14B is a side view of the inventive blade of the present invention showing the improved useful flow throughout the entire length of the blades.

The applicant has discovered that the performance of the various embodiments of the inventive blades are dependent upon the configuration of the blades 11, 12, 21, 22. For instance, a greater width 17, 27 tends to produce more torque while a narrower width 17, 27 tends to produce more speed. Additionally, the angle of twist 18, 28 of the blades 11, 12, 21, 22, which is generally a function of the shaft 15, 25 diameter and the spacing between the blades 11, 12, 21, 22 effects performance. In embodiments 10 and 20, the angle of twist 18, 28 may be varied by changing the space between the blade edges at the coplanar common line 13, 23 or the diameter of shaft 15, 25. Enlarging the shaft diameter 15, 25 or spacing between the blade edges will decrease the overall blade diameter and increase the angle of twist. As shown in FIGS. 14A and 14B, irregardless of the specific embodiment selected, the useful flow produced by the inventive blade is generally uniform throughout the length of the blades, which is a substantial improvement over the prior art blades.

Figures 5, 6, 7, 7A, 7B, 7C, 9A:
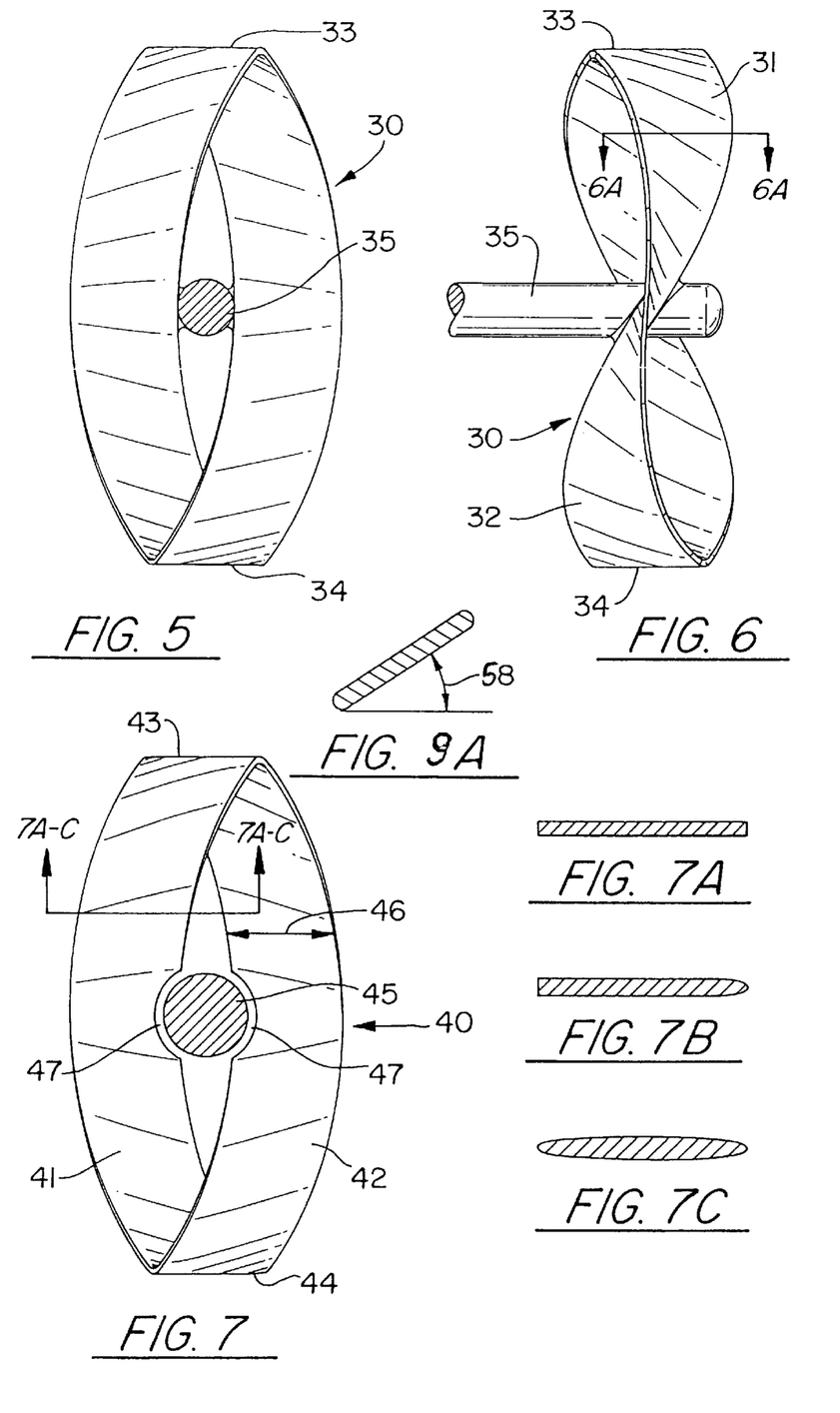
FIG. 5 is a front plan view of another embodiment of the inventive blade.
FIG. 6 is a left side view of the blade configuration of FIG. 5.
FIG. 7 is a front plan view of another embodiment of the inventive blade adapted for use with a larger hub.
FIGS. 7A–7C are alternative cross-sectional configurations of the inventive blade, taken along the line 7A–7C, of FIG. 7.
FIG. 9A is a cross-sectional view, taken along the line 9A—9A, of FIG. 9.

Another blade embodiment 30 of the present invention is illustrated in FIGS. 5 and 6. Blade embodiment 30 provides a more lineal convergence of the sides of each blade 31,32, than the generally rounded or curved configuration of blade embodiments 10 and 20, thereby achieving a somewhat angled apex at the blades outermost distal ends 33, 34. This configuration is better understood by envisioning the distal ends of the loops formed by blades 11, 12, 21, 22 of FIGS. 1 and 3 being pinched together to form a crease at the top or distal ends 33, 34 of each blade 31, 32. Applicant has discovered that blade embodiment 30, when used as a propeller, is advantageous because it results in a larger working surface area for a given size of the strip of material used to form the blade configuration.

Referring now to FIG. 7, blade embodiment 40, which is a variation of blade embodiment 30 of FIG. 5, includes blades 41, 42 of varying width 46 and a more sharply defined apex or crease at the outer distal ends 43, 44 of the loops. The width of blades 41, 42 are greater at the shaft 45 than at the apex or crease at the outer distal ends 43, 44 of the loops. In this embodiment, the blades 41, 42 may include a cut-out portion 47 to facilitate attachment to the shaft 45. FIGS. 7A–7C illustrate some of the various cross-sectional shapes that the inventive blades 41, 42 may assume in practice. Other cross-sectional shapes may, alternatively, be used.

Figures 6A, 8, 9:
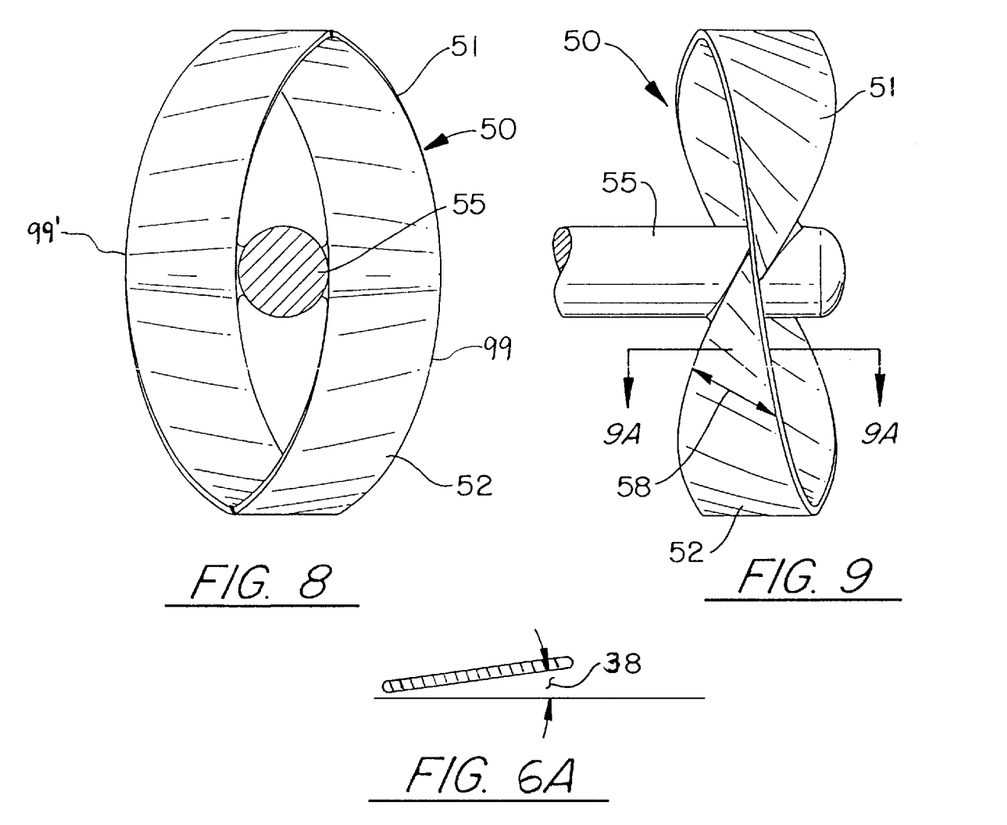
FIG. 6A is a cross sectional view taken along the line 6A—6A of FIG. 6.
FIG. 8 is a front plan view of the blade configuration of FIG. 7.
FIG. 9 is a side view of another embodiment of the inventive blade.

Blade embodiment 50 in FIGS. 8 and 9 illustrate the use of blade embodiment 30 with a shaft 55 having a greater diameter, resulting in a larger spacing between the blades 51, 52 at the shaft 55 mounting location. FIGS. 6A and 9A illustrate the difference in the angle of twist of the blades 31, 32 and 51, 52 caused by the different spacings between the blades 31, 32 and 51, 52.

Figure 10:
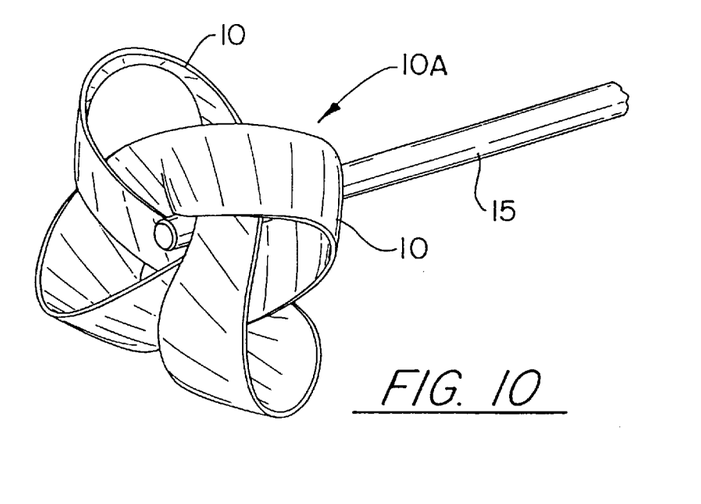
FIG. 10 is a perspective view of another embodiment of the inventive blade showing two three dimensional figure eights, comprising two flat strips, intertwined.
Figure 11A:
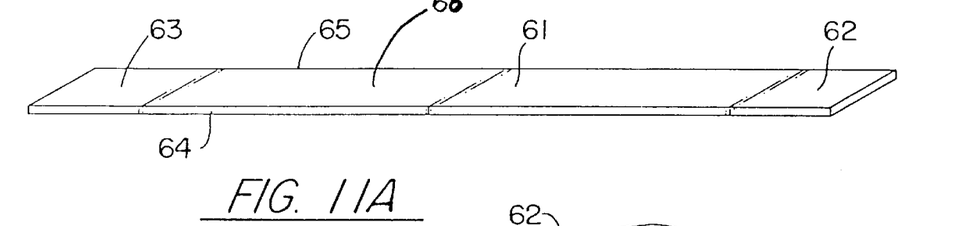
FIGS. 11A–11D illustrate a method of forming the inventive blade.
Figure 11B:
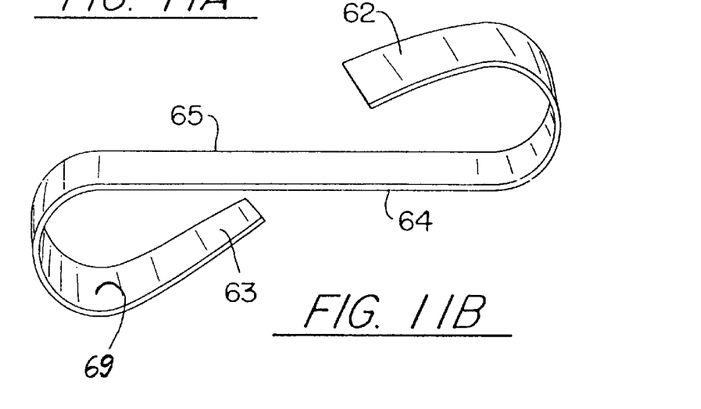
Figure 11C:
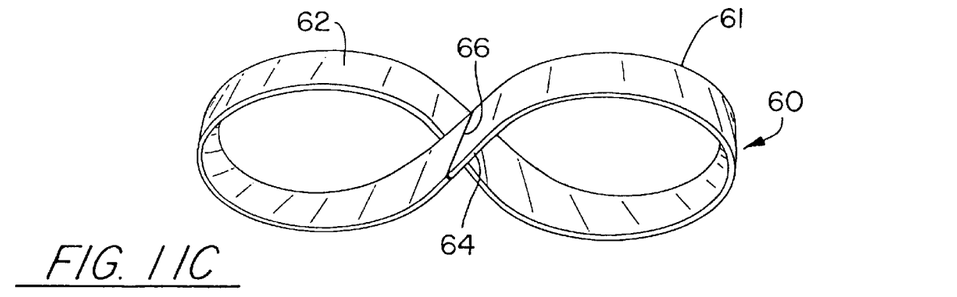

Referring now to FIG. 10, blade embodiment 10A illustrates a pair of the figure eight configured inventive blades 10 mounted symmetrically on a single shaft 15. In this embodiment, the longitudinal axis of each of the figure eight configured inventive blades 10 are disposed in perpendicular relation with one another within the same plane. Depending upon the particular application and the desired performance, three or more inventive blades may be symmetrically positioned on the shaft 15 with the blades of each intertwined.

Figure 11D:
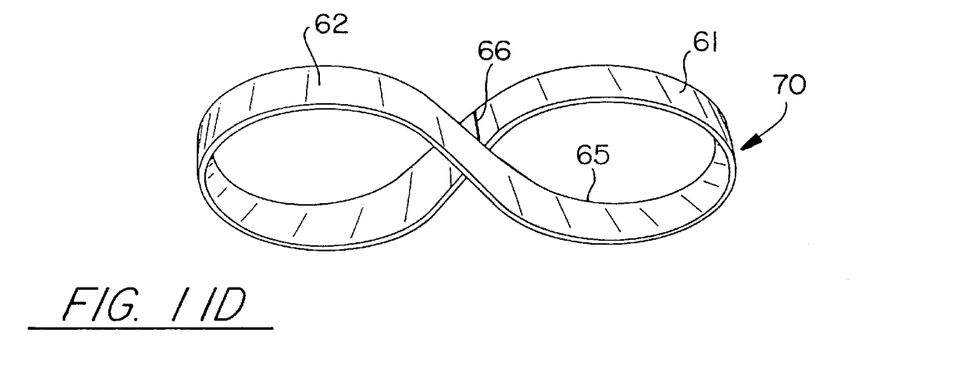

FIGS. 11A–11C illustrate a method of fabricating the various embodiments of the inventive blades. FIG. 11A depicts an elongated strip of material 61, such as steel, brass, bronze, plastic, polypropylene, paper or any other suitable rigid or flexible material. The thickness, length and width may be selected to achieve the desired operating characteristics and aesthetic appearance for the particular application. In FIG. 11B, a first end 62 is curved upward and a second opposite end 63 is curved downward. As shown in FIG. 11C, curved ends 62, 63 are shifted to a generally central longitudinal side edge 64 of the strip 61 and joined together by welding or any other suitable attachment means. The blade apparatus 60 of FIG. 11C can it considered to have a left-handed twist, like the blade embodiment 20 of FIGS. 3 and 4. Similarly, as shown in FIG. 11D, a right-handed twist can be achieved by joining curved ends 62, 63 at the other longitudinal side edge 64 of the strip 61, like the blade embodiment 10 of FIGS. 1 and 2.

Figure 12:
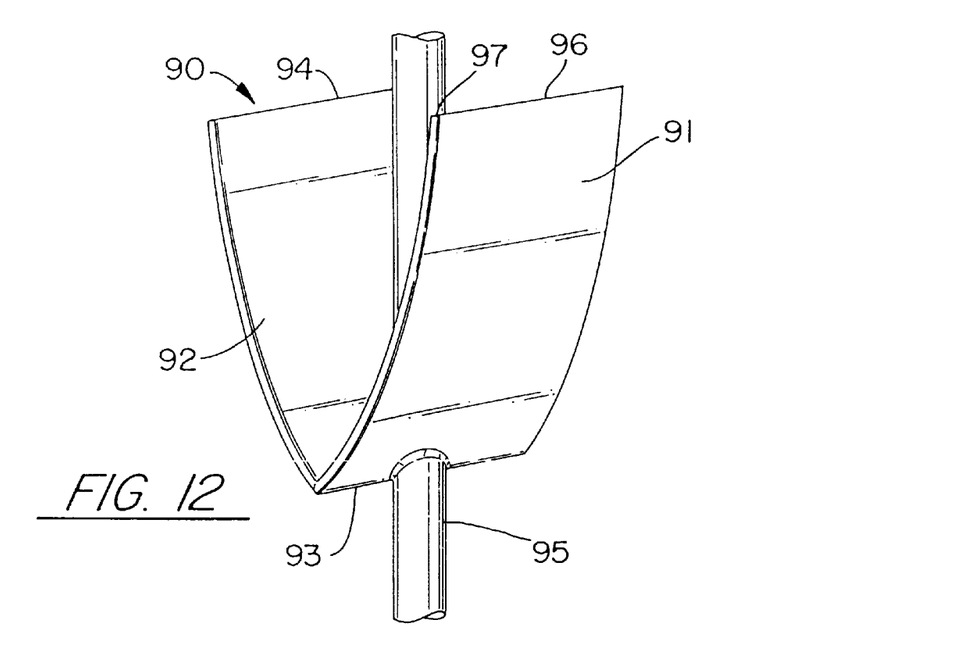
FIG. 12 is a perspective view of another embodiment of the inventive blade.

Referring now to FIG. 12, embodiment 90 utilizes only one outer half of the loops comprising the FIG. 8. Shaft 95 extends between the ends 93 of blades 91, 92 and is disposed in generally parallel relation to the longitudinal axis of blades 91, 92. Shaft 95 may extend up to or beyond distal ends 94, 96 of blades 92, 91. Embodiment 90 shows ends 93 having a generally angled apex or crease, but they may, alternatively, be rounded or otherwise configured. The configuration of blade embodiment 90 is useful to create a vacuum.

Figure 13:
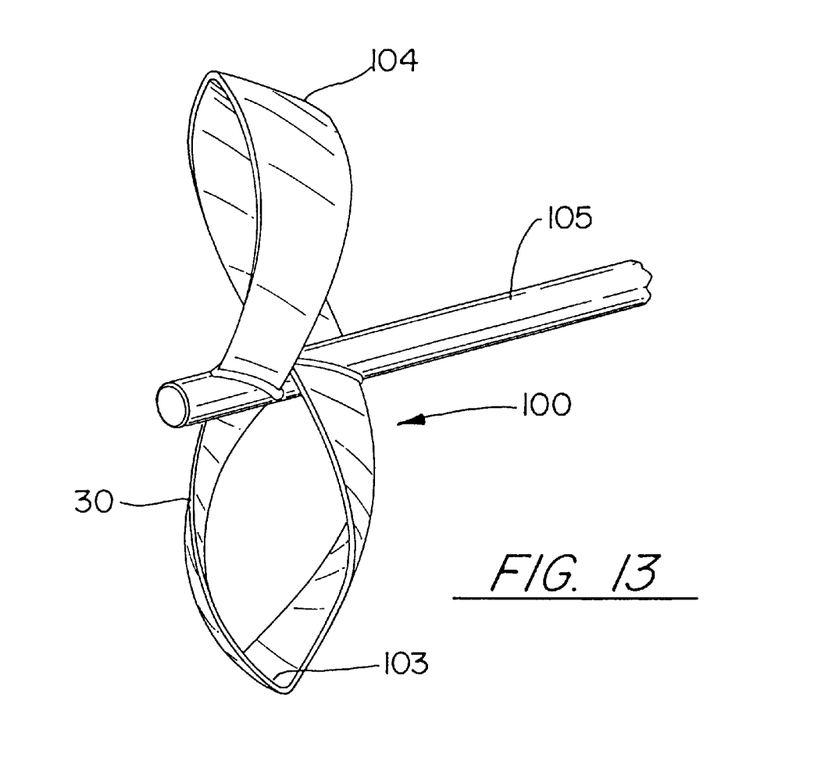
FIG. 13 is a perspective view of still another embodiment of the inventive blade.

FIG. 13 illustrates a blade embodiment 100 having the longitudinal axis of the shaft 105 in generally parallel relation the lateral or transverse axis of the blades. This FIG. 8 blade configuration is essentially the same as that shown in FIG. 6, except the shaft 105 is oriented at a 90° angle, within the same horizontal plane, relative to the shaft 35 of FIG. 6. Blade embodiment 100 is shown with angled apexes or creases 103, 104, but they may, alternatively, be rounded or otherwise configured.

In accordance with the above description, it is seen that the structure of the inventive blades may vary greatly, resulting in a multitude of different possible embodiments or arrangements to either propel a vehicle, power a shaft, create a vacuum, or move or pump a medium. The particular embodiment or arrangement selected is dependant upon the desired application or use. The optimum size, cross-sectional shape and angle of twist in the embodiment or arrangement selected may be readily determined by simple prototype testing under actual environmental conditions.

The propeller/impeller blade apparatus of the present invention provides more efficient direct flow of a medium past the blades in a direction consistent with the twist of the blades than the prior art blade apparatus. For instance, when used as a propeller, less radial flow occurs, and consequently, less energy is wasted, than that of conventional propellers. Such improvement in axial flow is also useful when the inventive blades are used as a pump impeller in line with flow through a conduit. Other advantages and usages will be apparent to those of ordinary skill in the art.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

What is claimed is:

1. A propeller/impeller blade apparatus adapted to propel a vehicle or other device, create a vacuum, or move a medium comprising:

a generally flat strip-like member having an upper surface, an opposite lower surface, a first end and an opposite second end, said first and second ends being joined together by turning said first end in an upward direction and said second end in a downward direction to form a looped structure, said looped structure being structured so that proceeding from a location on said upper surface longitudinally in a single direction will lead to the same said location on said upper surface without traversing said lower surface; and a shaft mounted between opposing longitudinal side edges of said looped structure so that a longitudinal axis of said shaft is disposed in perpendicular relation to a longitudinal axis of said looped structure.

2. A propeller/impeller blade apparatus as recited in claim 1 wherein said member includes a plurality of generally flat strips of material.

3. A propeller/impeller blade apparatus as recited in claim 1 wherein said looped structure includes at least one angled apex.

4. A propeller/impeller blade apparatus as recited in claim 1 wherein said looped structure is disposed symmetrically about said longitudinal axis of said shaft.

5. A propeller/impeller blade apparatus as recited in claim 1 wherein said member includes a varying cross-sectional shape.

* * * * *